US012792720B2

(12) United States Patent
Xian

(10) Patent No.: US 12,792,720 B2
(45) Date of Patent: Nov. 10, 2026

(54) IN-VEHICLE DEVICE, CONTROL METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Yuanjun Xian, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 53 days.

(21) Appl. No.: 18/866,208

(22) PCT Filed: May 1, 2023

(86) PCT No.: PCT/JP2023/016998

§ 371 (c)(1),
(2) Date: Nov. 15, 2024

(87) PCT Pub. No.: WO2023/223817

PCT Pub. Date: Nov. 23, 2023

(65) Prior Publication Data

US 2025/0200167 A1 Jun. 19, 2025

(30) Foreign Application Priority Data

May 16, 2022 (JP) ................................ 2022-079934

(51) Int. Cl.
*G06F 21/44* (2013.01)
*H04L 12/40* (2006.01)

(52) U.S. Cl.
CPC .............. *G06F 21/44* (2013.01); *H04L 12/40* (2013.01); *H04L 2012/40273* (2013.01)

(58) Field of Classification Search
CPC .......... G06F 21/00; G06F 21/30; G06F 21/44; G06F 21/445; H04L 12/00; H04L 12/28;
(Continued)

(56) References Cited

U.S. PATENT DOCUMENTS 5,068,752 A * 11/1991 Tanaka .................. H04N 5/928 360/32
5,297,165 A * 3/1994 Ueda ................ H04L 25/03019 375/232

(Continued)

OTHER PUBLICATIONS

Tsukamoto, Hiroyuki et al., Evaluation of the Clock-based Intrusion Detection System. Computer Security Symposium, Oct. 21-24, 2019. 2019 Information Processing Society of Japan, pp. 55-62.

*Primary Examiner* — James M Perez
(74) *Attorney, Agent, or Firm* — Brooks Kushman P.C.

(57) ABSTRACT

An in-vehicle device connected to an ECU installed in a vehicle includes: a PHY unit which converts a signal from the communication line into a digital signal; an oscillation circuit which outputs a first oscillation signal; a detection circuit which outputs a detected value corresponding to a difference between a frequency of the first oscillation signal and a frequency of a second oscillation signal; a switch unit which switches between a first state and a second state; and a control unit configured to control the switch unit. The control unit controls the switch unit to be in the first state if the detected value differs from a normal value corresponding to a difference between the frequency of the first oscillation signal and a frequency of a third oscillation signal and controls the switch unit to be in the second state if the detected value is within the predetermined value.

13 Claims, 11 Drawing Sheets

(58) Field of Classification Search

CPC ............... H04L 12/40; H04L 12/40006; H04L 12/40032; H04L 2012/40267; H04L 2012/40273; H04L 67/00; H04L 67/01; H04L 67/12; H04L 67/125

See application file for complete search history.

(56) References Cited

U.S. PATENT DOCUMENTS 5,388,100 A * 2/1995 Ohtsuka ................ H04L 7/0083 375/357
5,442,273 A * 8/1995 Ikawa ..................... H02P 23/16 318/400.41
5,455,840 A * 10/1995 Nakauchi .................. H03L 7/08 327/147
5,507,024 A * 4/1996 Richards, Jr. .......... H04H 40/54 455/45
5,519,449 A * 5/1996 Yanai ..................... H04N 19/61 348/580
5,598,221 A * 1/1997 Miyahara ................. H04N 5/46 348/554
5,671,260 A * 9/1997 Yamauchi .............. H04N 5/956 375/372
5,774,195 A * 6/1998 Miyahara ......... H04N 21/44209 455/142
6,870,282 B1 * 3/2005 Bischoff ............... H04L 12/403 307/130
10,523,273 B1 * 12/2019 Mizutani ................. H04L 12/40
10,862,703 B2 * 12/2020 Ogawa .................. H04L 63/101
11,152,973 B2 * 10/2021 Mashita ................. H04B 3/548
11,178,158 B2 * 11/2021 Buffard ................. H04L 9/3247
11,342,960 B2 * 5/2022 Xian ....................... H04L 12/44
11,343,347 B2 * 5/2022 Xian ....................... H04L 12/46
12,007,919 B2 * 6/2024 Xian ....................... G06F 13/24
12,199,875 B2 * 1/2025 Xian ....................... H04L 12/40
12,266,225 B2 * 4/2025 Kawauchi ........... H04L 12/4641
12,284,263 B2 * 4/2025 Ueno .................... H03L 7/0807
12,316,519 B2 * 5/2025 Adachi ................... H04L 12/28
12,567,942 B2 * 3/2026 Ota ....................... H04J 3/0667
2003/0043432 A1 * 3/2003 Marmur ................. H04B 10/29 398/139
2004/0076119 A1 * 4/2004 Aronson ................ H04B 10/40 370/242
2005/0084048 A1 * 4/2005 Wu ....................... H04L 7/0337 375/355
2005/0169585 A1 * 8/2005 Aronson ................ H04B 10/40 385/89
2005/0281193 A1 * 12/2005 Hofmeister ............. H04L 1/205 370/217
2007/0069875 A1 * 3/2007 Doi ....................... G06F 21/554 340/440
2011/0145433 A1 * 6/2011 Noel ..................... H04L 12/437 709/232
2013/0034137 A1 * 2/2013 Zuckerman ......... H04L 25/0266 375/222
2014/0334568 A1 * 11/2014 Gotou .................... H04B 3/548 375/271
2015/0001857 A1 * 1/2015 Sekiguchi ............. F02N 11/087 290/38 C
2018/0290605 A1 * 10/2018 Ito ........................... B60R 16/02
2019/0084580 A1 * 3/2019 Kodama ............... H04W 12/06
2019/0109735 A1 * 4/2019 Norimatsu ............ H03L 7/0807
2019/0229946 A1 * 7/2019 Shiroki ................... H04L 12/40
2019/0238555 A1 * 8/2019 Buffard ............... H04L 63/0823
2019/0386702 A1 * 12/2019 Mizutani ............. B60R 16/0231
2020/0064416 A1 * 2/2020 Fujiura .................. G01D 3/036
2020/0119722 A1 * 4/2020 Kamiyama ............... G06F 1/12
2020/0153655 A1 * 5/2020 Ogawa .................... H04W 4/40
2020/0313724 A1 * 10/2020 Mashita ............... H03H 7/0138
2020/0350663 A1 * 11/2020 Ambe ..................... B60R 11/02
2020/0410785 A1 * 12/2020 Kawauchi ............ G07C 5/0816
2021/0328624 A1 * 10/2021 Xian ....................... H04L 12/44
2021/0328931 A1 * 10/2021 Xian ....................... H04L 12/40
2021/0344773 A1 * 11/2021 Xian ................. H04L 12/40189
2022/0141049 A1 * 5/2022 Lee ......................... H04L 12/40 701/1
2022/0374372 A1 * 11/2022 Xian ....................... G06F 13/24
2022/0393894 A1 * 12/2022 Xian ....................... H04L 12/28
2023/0238942 A1 * 7/2023 Kobayashi ............... H04B 3/50 327/552
2023/0291536 A1 * 9/2023 Ueno .................... H03L 7/0807
2023/0388100 A1 * 11/2023 Yu ........................... H03L 7/085
2024/0089170 A1 * 3/2024 Miyajo ................... H04W 4/48
2024/0195598 A1 * 6/2024 Ota ........................ H04J 3/0667
2025/0117059 A1 * 4/2025 Taninaka ................ B60R 16/03
2025/0200167 A1 * 6/2025 Xian ..................... H04L 49/112
2026/0005827 A1 * 1/2026 Tao ......................... H03L 7/091

* cited by examiner

FIG. 8

| Temperature | Normal value |
|---|---|
| $T_x \leqq T_1$ | V11 |
| $T_1 < T_x \leqq T_2$ | V12 |
| $T_2 < T_x \leqq T_3$ | V13 |
| ⋮ | ⋮ |

IN-VEHICLE DEVICE, CONTROL METHOD, AND COMPUTER PROGRAM

CROSS-REFERENCE TO RELATED APPLICATIONS

This application is the U.S. national stage of PCT/JP2023/016998 filed on May 1, 2023, which claims priority of Japanese Patent Application No. JP 2022-079934 filed on May 16, 2022, the contents of which are incorporated herein.

TECHNICAL FIELD

The present disclosure relates to an in-vehicle device, a control method, and a computer program.

BACKGROUND ART

Technologies for preventing unauthorized intrusion into in-vehicle networks including ECUs (Electronic Control Units) installed in vehicles, and the like are known. For example, in JP 2019-125991A, a CPU included in an ECU monitors a terminal connected to a port thereof. If the MAC address of the connected terminal differs from the destination MAC address of the terminal registered in advance in a MAC address table, this port is disabled, thereby preventing unauthorized intrusion into an in-vehicle LAN.

In recent years, there is a technique in which an unauthorized terminal steals data transmitted and received between a plurality of ECUs in an in-vehicle network to record the normal sequence in the unauthorized terminal, and then the unauthorized terminal impersonates one of the ECUs to intrude into the in-vehicle network in an unauthorized manner.

In this case, since the unauthorized terminal copies the MAC addresses of the ECUs included in the in-vehicle network, the unauthorized intrusion cannot be detected by a conventional monitoring method as disclosed in JP 2019-125991A.

In view of such circumstances, it is an object of the present disclosure to provide an in-vehicle device, a control method, and a computer program that can detect an unauthorized intrusion more reliably.

SUMMARY

The in-vehicle device according to the present disclosure is an in-vehicle device connected to an ECU installed in a vehicle by a communication line, the in-vehicle device including: a PHY unit configured to convert a received signal received from the communication line into a digital signal; an oscillation circuit configured to output a first oscillation signal based on an oscillation of a first oscillator; a detection circuit configured to output a detected value corresponding to a difference between a frequency of the first oscillation signal and a frequency of a second oscillation signal contained in the received signal; a switch unit configured to switch between a first state in which at least a part of the received signal is not input to the PHY unit, and a second state in which the received signal is input to the PHY unit; and a control unit configured to control the switch unit, wherein the control unit controls the switch unit to be in the first state if the detected value differs, by more than a predetermined value, from a normal value corresponding to a difference between the frequency of the first oscillation signal and a frequency of a third oscillation signal generated based on an oscillation of a second oscillator included in the ECU, and controls the switch unit to be in the second state if the detected value is within the predetermined value from the normal value.

The control method according to the present disclosure is a control method for controlling an in-vehicle device connected to an ECU installed in a vehicle by a communication line, the method including: a first step of switching the in-vehicle device to a first state in which at least a part of a received signal received from the communication line is not input to a PHY unit, if a detected value differs from a normal value by more than a predetermined value; and a second step of switching the in-vehicle device to a second state in which the received signal is input to the PHY unit, if the detected value is within the predetermined value from the normal value, wherein the PHY unit converts the received signal into a digital signal, the detected value is a value corresponding to a difference between a frequency of a first oscillation signal output by an oscillation circuit included in the in-vehicle device based on an oscillation of a first oscillator and a frequency of a second oscillation signal contained in the received signal, and the normal value is a value corresponding to a difference between the frequency of the first oscillation signal and a frequency of a third oscillation signal generated based on an oscillation of a second oscillator included in the ECU.

The computer program according to the present disclosure is a computer program for controlling an in-vehicle device connected to an ECU installed in a vehicle by a communication line, the computer program causing a computer to execute: a first step of switching the in-vehicle device to a first state in which at least a part of a received signal received from the communication line is not input to a PHY unit, if a detected value differs from a normal value by more than a predetermined value; and a second step of switching the in-vehicle device to a second state in which the received signal is input to the PHY unit, if the detected value is within the predetermined value from the normal value, wherein the PHY unit converts the received signal into a digital signal, the detected value is a value corresponding to a difference between a frequency of a first oscillation signal output by an oscillation circuit included in the in-vehicle device based on an oscillation of a first oscillator and a frequency of a second oscillation signal contained in the received signal, and the normal value is a value corresponding to a difference between the frequency of the first oscillation signal and a frequency of a third oscillation signal generated based on an oscillation of a second oscillator included in the ECU.

Advantageous Effects

According to the present disclosure, it is possible to detect an unauthorized intrusion more reliably.

BRIEF DESCRIPTION OF DRAWINGS

FIG. 8 is a table showing examples of the relationship between the normal value and the temperature according to a modification.

DETAILED DESCRIPTION OF PREFERRED EMBODIMENTS

Figure 1:
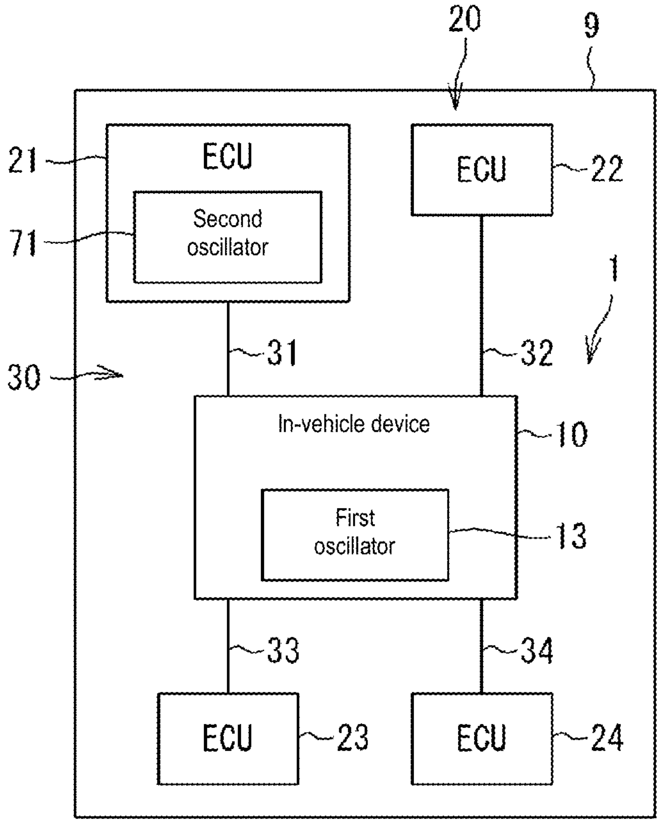
FIG. 1 is a diagram showing an example of a configuration of an in-vehicle system according to an embodiment.

The embodiment of the present disclosure includes, as the gist thereof, the following configurations.

In a first aspect, the in-vehicle device according to the present disclosure is an in-vehicle device connected to an ECU installed in a vehicle by a communication line, the in-vehicle device including: a PHY unit configured to convert a received signal received from the communication line into a digital signal; an oscillation circuit configured to output a first oscillation signal based on an oscillation of a first oscillator; a detection circuit configured to output a detected value corresponding to a difference between a frequency of the first oscillation signal and a frequency of a second oscillation signal contained in the received signal; a switch unit configured to switch between a first state in which at least a part of the received signal is not input to the PHY unit, and a second state in which the received signal is input to the PHY unit; and a control unit configured to control the switch unit, wherein the control unit controls the switch unit to be in the first state if the detected value differs, by more than a predetermined value, from a normal value corresponding to a difference between the frequency of the first oscillation signal and a frequency of a third oscillation signal generated based on an oscillation of a second oscillator included in the ECU, and controls the switch unit to be in the second state if the detected value is within the predetermined value from the normal value.

Although the unauthorized terminal or the like can imitate the communication sequence and the like of the ECU, it cannot imitate the third oscillation signal caused by the second oscillator of the ECU. Therefore, by determining whether or not the frequency of the second oscillation signal received from a communication line corresponds to the frequency of the third oscillation signal, it is possible to detect an unauthorized intrusion more reliably.

In a second aspect, in the in-vehicle device according to the first aspect, the detection circuit may include: a first circuit to which the first oscillation signal and the second oscillation signal are input, and that is configured to detect a difference between the frequency of the first oscillation signal and the frequency of the second oscillation signal; and a second circuit configured to convert the difference detected by the first circuit into the detected value.

With this configuration, a difference between the frequency of the first oscillation signal and the frequency of the second oscillation signal can be converted into a detected value.

In a third aspect, in the in-vehicle device according to the second aspect, the received signal may be a signal in which the second oscillation signal and a data signal are superimposed. In this case, the in-vehicle device may further include an extraction circuit configured to extract the second oscillation signal from the received signal and output the extracted second oscillation signal to the first circuit.

With this configuration, the second oscillation signal can be extracted from a received signal.

In a fourth aspect, the in-vehicle device according to any one of the first through the third aspects may further include a storage unit in which the normal value is stored in advance.

In a fifth aspect, in the in-vehicle device according to the fourth aspect, the control unit may be capable of selecting a plurality of operation modes, including a first mode and a second mode, and when the first mode is selected, the control unit may change the normal value stored in the storage unit to the detected value to be output from the detection circuit while the first mode is selected, and when the second mode is selected, the control unit may not change the normal value stored in the storage unit.

With this configuration, a frequency deviation of an oscillator caused by an aging-related change can be compensated, and thus it is possible to detect an unauthorized intrusion more reliably.

In a sixth aspect, in the in-vehicle device according to the fourth or the fifth aspects, the control unit may determine the normal value based on a detected temperature detected by a temperature sensor configured to detect a temperature of at least one of the first oscillator and the second oscillator.

With this configuration, a frequency deviation of an oscillator caused by a temperature change can be compensated, and thus it is possible to detect an unauthorized intrusion more reliably.

In a seventh aspect, in the in-vehicle device according to any one of the the first through the sixth aspects, the control unit may control a temperature adjustment unit configured to adjust a temperature of the second oscillator, the detection circuit may output a first detected value to the control unit, the first detected value being the detected value corresponding to a difference between the frequency of the first oscillation signal and the frequency of the second oscillation signal contained in the received signal received while the second oscillator is adjusted to have a first given temperature by the temperature adjustment unit; and the control unit may control the switch unit to be in the first state, if the first detected value differs from a first normal value by more than a predetermined value, the first normal value being the normal value corresponding to a difference between the frequency of the first oscillation signal and the frequency of the third oscillation signal generated based on the oscillation of the second oscillator while the second oscillator is adjusted to have the first given temperature by the temperature adjustment unit.

With this configuration, if the first detected value does not follow the temperature adjustment by the temperature adjustment unit, an unauthorized intrusion is detected, and if the first detected value follows the temperature adjustment by the temperature adjustment unit, no unauthorized intrusion is detected. With this measure, even if the frequency of the second oscillator and the frequency of the third oscillator coincide by chance at a certain temperature, an unauthorized intrusion can be detected.

In an eighth aspect, the control method according to the present disclosure is a control method for controlling an in-vehicle device connected to an ECU installed in a vehicle by a communication line, the method including: a first step of switching the in-vehicle device to a first state in which at least a part of a received signal received from the communication line is not input to a PHY unit, if a detected value differs from a normal value by more than a predetermined value; and a second step of switching the in-vehicle device to a second state in which the received signal is input to the PHY unit, if the detected value is within the predetermined value from the normal value, wherein the PHY unit converts the received signal into a digital signal, the detected value is a value corresponding to a difference between a frequency of a first oscillation signal output by an oscillation circuit included in the in-vehicle device based on an oscillation of a first oscillator and a frequency of a second oscillation signal contained in the received signal, and the normal value is a value corresponding to a difference between the frequency of the first oscillation signal and a frequency of a third oscillation signal generated based on an oscillation of a second oscillator included in the ECU.

Although the unauthorized terminal or the like can imitate the communication sequence and the like of the ECU, it cannot imitate the third oscillation signal caused by the second oscillator of the ECU. Therefore, by determining whether or not the frequency of the second oscillation signal received from the communication line corresponds to the frequency of the third oscillation signal, it is possible to detect an unauthorized intrusion more reliably. Also, the received signal is input to the PHY unit only when there is no unauthorized intrusion, making it possible to prevent an unauthorized received signal from being input to the PHY unit.

In a ninth aspect, the computer program according to the present disclosure is a computer program for controlling an in-vehicle device connected to an ECU installed in a vehicle by a communication line, the computer program causing a computer to execute: a first step of switching the in-vehicle device to a first state in which at least a part of a received signal received from the communication line is not input to a PHY unit, if a detected value differs from a normal value by more than a predetermined value; and a second step of switching the in-vehicle device to a second state in which the received signal is input to the PHY unit, if the detected value is within the predetermined value from the normal value, wherein the PHY unit converts the received signal into a digital signal, the detected value is a value corresponding to a difference between a frequency of a first oscillation signal output by an oscillation circuit included in the in-vehicle device based on an oscillation of a first oscillator and a frequency of a second oscillation signal contained in the received signal, and the normal value is a value corresponding to a difference between the frequency of the first oscillation signal and a frequency of a third oscillation signal generated based on an oscillation of a second oscillator included in the ECU.

Although the unauthorized terminal or the like can imitate the communication sequence and the like of the ECU, it cannot imitate the third oscillation signal caused by the second oscillator of the ECU. Therefore, by determining whether or not the frequency of the second oscillation signal received from the communication line corresponds to the frequency of the third oscillation signal, it is possible to detect an unauthorized intrusion more reliably. Also, the received signal is input to the PHY unit only when there is no unauthorized intrusion, making it possible to prevent an unauthorized received signal from being input to the PHY unit.

Hereinafter, an embodiment of the present disclosure will be described in detail with reference to the drawings.

Configuration of In-Vehicle System 1

FIG. 1 is a diagram showing an example of a configuration of an in-vehicle system 1 according to an embodiment.

The in-vehicle system 1 is a system installed in a vehicle 9 such as an automobile. The in-vehicle system 1 includes an in-vehicle device 10, a plurality of ECUs (Electronic Control Units) 20, and a plurality of communication lines 30 that connect the in-vehicle device 10 and the plurality of ECUs 20. The in-vehicle device 10 and the plurality of ECUs 20 are connected to each other by the communication lines 30 to constitute an in-vehicle network.

The in-vehicle device 10 is a relay device that relays data to be transmitted and received between the plurality of ECUs 20, for example. Specifically, the in-vehicle device 10 is a relay device that functions as an Ethernet switch (Ethernet is a registered trademark) and an L2 switch. Note that the in-vehicle device 10 may be an integrated ECU that manages control of the plurality of ECUs 20 or may be the same ECU as the plurality of ECUs 20.

The number of ECUs 20 included in the in-vehicle system 1 is not particularly limited, and one ECU 20 may be provided. In the example of FIG. 1, the in-vehicle system 1 includes four ECUs 20. When the four ECUs 20 are distinguished from each other, they are referred to respectively as ECUs 21, 22, 23, and 24.

The ECUs 20 are devices (operation ECUs) that respectively control components (such as, e.g., a braking system, doors, a battery and an air conditioner) of the vehicle 9, for example. The functions of the ECUs 20 are not particularly limited, and each ECU 20 may be a device (cognizance ECU) that communicates with a sensor to monitor the state of the corresponding component of the vehicle 9. The plurality of ECUs 20 may have different functions or may have the same function.

The plurality of (four in the example of FIG. 1) communication lines 30 extend from the in-vehicle device 10. When the four communication lines 30 are distinguished from each other, the line extending to the ECU 21 is referred to as a communication line 31, the line extending to the ECU 22 is referred to as a communication line 32, the line extending to the ECU 23 is referred to as a communication line 33, and the line extending to the ECU 24 is referred to as a communication line 34.

If the in-vehicle network is a network based on the Ethernet standard, the communication lines 30 are communication lines conforming to the 1000BASE-T1 or 1000BASE-RH standard, for example. Note that the communication lines 30 may also conform to another standard such as CAN (Controller Area Network).

Figure 2:
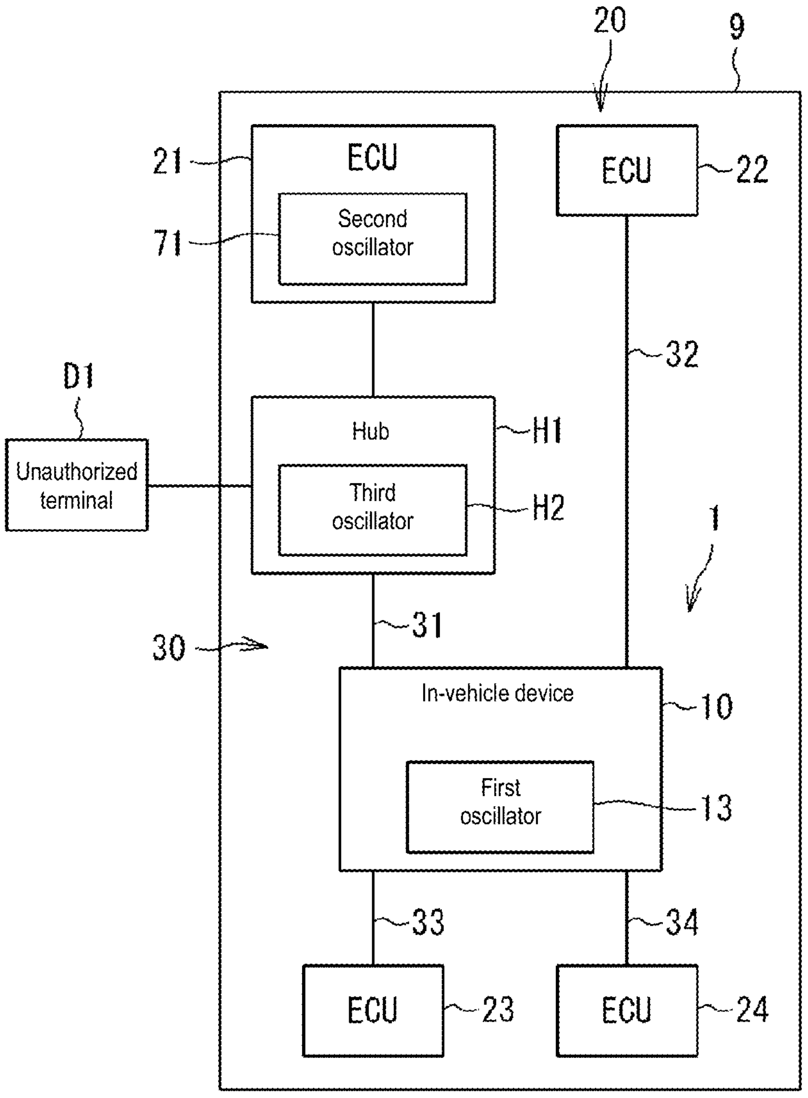
FIG. 2 is a diagram showing a state in which the in-vehicle system of FIG. 1 is intruded in an unauthorized manner.

FIG. 2 is a diagram showing a state in which the in-vehicle system 1 is intruded in an unauthorized manner. First, an intruder inserts a hub H1, to which an unauthorized terminal D1 is connected, at an intermediate position on the communication line 31. The unauthorized terminal D1 is a personal computer such as a laptop computer, or a tablet terminal, for example. The hub H1 is a repeater hub that copies data flowing through the communication line 31, for example. For example, the intruder cuts the communication line 31, attaches a connector to each of the cut portions, and connects the hub H1 to the connectors. The intruder may also pull the communication line 31 from one of the in-vehicle device 10 and the ECU 21, insert the pulled communication line 31 into the hub H1, and connect a new communication line from the hub H1 to the other of the in-vehicle device 10 and the ECU 21.

Then, the intruder copies the data flowing through the communication line 31 to the unauthorized terminal D1 connected to the hub H1. Then, the unauthorized terminal D1 analyzes, based on the data, the MAC (Media Access Control) address of the ECU 21 and the sequence of communication between the ECU 21 and the in-vehicle device 10, for example. Thereafter, the unauthorized terminal D1 copies the MAC address of the ECU 21 and the communication sequence, thereby impersonating the ECU 21 and transmitting unauthorized data to the in-vehicle device 10.

In the case of JP 2019-125991A, for example, it is determined whether the communication counterpart is authorized or unauthorized based on the MAC address. In the above-described intrusion technique, since the MAC address of the ECU 21 is copied and an unauthorized intrusion is made, an unauthorized intrusion cannot be detected by a software-based monitoring method as disclosed in JP 2019-125991A.

Therefore, in the present embodiment, by focusing on the frequency of an oscillator (e.g., crystal oscillator) included in the ECU 20, an unauthorized intrusion is detected. The plurality of ECUs 20 are each provided with an oscillator for generating an oscillation signal (clock signal). For example, the ECU 21 includes a second oscillator 71. The frequency of an oscillator has individual differences (allowable deviations), and even oscillators with the same specifications can have frequency differences of about ±20 to 50 ppm, for example. For this reason, conventionally, clocks are synchronized in order to eliminate this frequency difference on the signal receiving side.

As shown in FIG. 1, in a normal state (where there is no unauthorized intrusion), the in-vehicle device 10 receives an oscillation signal SG3 (an example of the "third oscillation signal" of the present disclosure) generated based on the oscillation of the second oscillator 71 included in the ECU 21.

On the other hand, as shown in FIG. 2, when the unauthorized terminal D1 impersonates the ECU 21 and transmits data to the in-vehicle device 10, the in-vehicle device 10 receives an oscillation signal SGx generated based on the oscillation of a third oscillator H2 included in the hub H1.

Even though the unauthorized terminal D1 can impersonate the ECU 21 with respect to the content of data, such as the MAC address of the ECU 21 and the communication sequence, the unauthorized terminal D1 cannot imitate the frequency of the oscillation signal SG3 transmitted from the ECU 21, because the frequency of the oscillation signal SGx transmitted to the in-vehicle device 10 depends on the characteristics of the third oscillator H2.

As a result of diligent research, the inventor has arrived at an invention of detecting an unauthorized intrusion more reliably by determining whether the frequency of an oscillation signal received by the in-vehicle device 10 corresponds to the frequency of the oscillation signal SG3 of the ECU 21, taking advantage of the fact that the unauthorized terminal D1 cannot imitate signals caused by a hardware configuration such as an oscillator. The following will describe the specific configurations thereof.

Configuration of In-Vehicle Device 10

Figure 3:
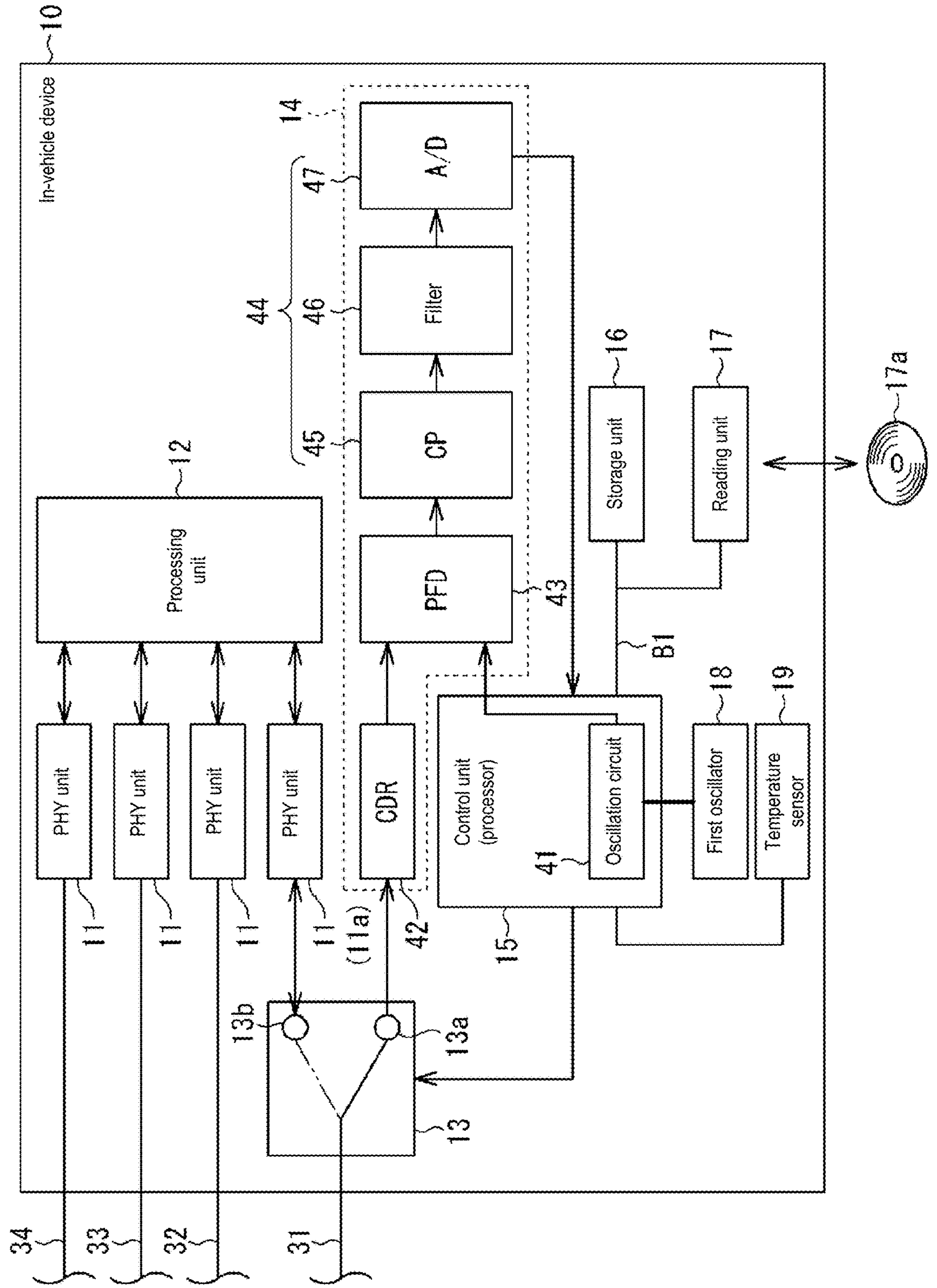
FIG. 3 is a diagram showing an example of a configuration of an in-vehicle device according to the embodiment.

FIG. 3 is a diagram showing an example of a configuration of the in-vehicle device 10 according to the embodiment.

The in-vehicle device 10 includes a plurality of PHY units 11, a processing device 12, a switch unit 13, a detection circuit 14, a control unit 15, a storage unit 16, a reading unit 17, a first oscillator 18, and a temperature sensor 19.

The PHY units 11 are each an area that operates in a physical layer in an OSI (Open System Interconnection) reference model, and is, for example, an integrated circuit such as an Ethernet PHY. Each PHY unit 11 has the function of converting an analog signal (received signal RS1) received from the communication line 30 into a digital signal DS1 that can be recognized by the processing device 12 and outputting a converted digital signal DS1 to the processing device 12, and the function of converting a digital signal DS1 input from the processing device 12 into an analog signal that can be recognized by the ECU 20 and transmitting the converted analog signal to the communication line 30.

In the in-vehicle device 10, four PHY units 11 are provided, corresponding to the number of ECUs 20.

Note that the number of PHY units 11 is not particularly limited, and for example, five or more PHY units 11 may be provided. The four PHY units 11 have the same internal configuration, and are connected to the four communication lines 31, 32, 33, and 34, respectively.

Among the four PHY units 11, the PHY unit that converts an analog signal received from the communication line 31 into a digital signal DS1 is referred to as a "PHY unit 11*a*" and is distinguished from the other PHY units 11. The PHY unit 11*a* is connected to a later-described second port 13*b* of the switch unit 13.

The processing device 12 is a device that performs various types of processing based on digital signals DS1 converted by the PHY units 11, and is an MCU (Micro Controller Unit), for example. The processing device 12 may be a PLD (Programmable Logic Device) such as a CPLD (Complex PLD) or an FPGA (Field Programmable Gate Array). The processing device 12 gives control instructions to the ECU 20 or analyzes the state of the ECU 20, in accordance with, for example, the digital signal DS1.

The switch unit 13 is, for example, a semiconductor switch, and specifically a switch including a MOSFET (Metal-Oxide-Semiconductor Field-Effect-Transistor). Note that the switch unit 13 may be a mechanical switch including a coil and a contact. The switch unit 13 is switched between a first state (indicated by a solid line in FIG. 3) and a second state (indicated by a virtual line in FIG. 3), in accordance with a control instruction from the control unit 15.

The first state is a state in which at least a part of a received signal RS1 received from the communication line 31 is not input to the PHY unit 11*a*. The second state is a state in which a received signal RS1 received from the communication line 31 is input to the PHY unit 11*a*. Specifically, the switch unit 13 includes a first port 13*a* electrically connected to the detection circuit 14, and the second port 13*b* electrically connected to the PHY unit 11*a*. For example, in the first state, the switch unit 13 electrically connects the communication line 31 to the first port 13*a* to output the entire received signal RS1 received from the communication line 31 to the detection circuit 14, and does not input any received signal RS1 to the PHY unit 11*a*.

Note that in the first state, the switch unit 13 may for example, temporally divide a received signal RS1, output a part of the signal to the detection circuit 14, and input the remaining parts of the signal to the PHY unit 11*a*. In this case, since the defective signal is input to the PHY unit 11*a*, conversion into the digital signal DS1 cannot be executed and an error is caused, or even if the signal can be converted into the digital signal DS1 in the PHY unit 11*a*, an error is caused in the processing device 12. That is, in the first state, even if a part of the received signal RS1 is input to the PHY unit 11*a*, the processing device 12 does not execute any regular control based on that part of the signal.

In the second state, the switch unit 13 electrically connects the communication line 31 to the second port 13*b* to output a received signal RS1 received from the communication line 31 to the PHY unit 11*a*. For example, in the second state, the switch unit 13 outputs the entire received signal RS1 received from the communication line 31 (that is, under the perfect condition) to the PHY unit 11*a*. Here, the perfect condition of the received signal RS1 means a state sufficient for the received signal RS1 to be normally converted into a digital signal DS1 in the PHY unit 11*a*. Accordingly, if the received signal RS1 can be normally converted into a digital signal DS1 in the PHY unit 11*a* despite a part of the received signal RS1 being missing when the received signal RS1 passes through the switch unit 13, such a state is referred to as the "perfect condition".

The detection circuit 14 is a circuit that outputs, to the control unit 15, a detected value Vx corresponding to the difference between the frequency of a first oscillation signal SG1 generated based on the oscillation of the first oscillator 18, and the frequency of the second oscillation signal SG2 contained in the received signal RS1. Details of the detection circuit 14 will be described later.

The control unit 15 determines whether or not there is an unauthorized intrusion into the communication line 31 based on the detected value Vx, and controls the switch unit 13 in accordance with the determination result. Specifically, the control unit 15 compares the detected value Vx input from the detection circuit 14 with the normal value V1 stored in the storage unit 16. For example, the absolute value ($|Vx-V1|$) of the difference between the detected value Vx and the normal value V1 is calculated. Then, if the absolute value exceeds a margin value $\alpha(|Vx-V1|>\alpha)$, it is determined that there is an unauthorized intrusion into the communication line 31.

When it is determined that there is an unauthorized intrusion, the control unit 15 maintains the switch unit 13 in the first state, thereby preventing the received signal RS1 in the perfect condition from being input to the PHY unit 11*a*. When it is determined that there is no unauthorized intrusion, the control unit 15 switches the switch unit 13 from the first state to the second state so that the received signal RS1 is input to the PHY unit 11*a*. This allows the received signal RS1 in the perfect condition to be input to the PHY unit 11*a* only when no unauthorized intrusion is detected, making it possible to prevent input of an unauthorized received signal RS1 to the PHY unit 11*a*.

Also, when, in the first state, the entire received signal RS1 is input to the detection circuit 14, input to the PHY unit 11*a* is prevented while it is determined that there is an unauthorized intrusion, and thus the PHY unit 11*a* can be maintained in a power saving state such as a sleep state, making it possible to prevent the power consumption of the in-vehicle device 10.

The control unit 15 includes a circuitry such as a processor, for example. The control unit 15 specifically includes one or more CPUs (Central Processing Units). The processor included in the control unit 15 may be a GPU (Graphics Processing Unit). Also, the control unit 15 may be, for example, a SoC (System-on-a-Chip). The control unit 15 reads a computer program stored in the storage unit 16 and executes various types of calculation and control.

The control unit 15 includes an oscillation circuit 41 that generates a first oscillation signal SG1 based on the oscillation of the first oscillator 18. The oscillation circuit 41 is a clock circuit for operating the control unit 15. Note that the oscillation circuit 41 may be provided outside the control unit 15. In this case, the oscillation circuit 41 supplies the first oscillation signal SG1 to the control unit 15 from outside the control unit 15.

The storage unit 16 includes a volatile memory and a nonvolatile memory and stores various types of data including a normal value V1 described below. The volatile memory includes, for example, a RAM (Random Access Memory). Examples of the nonvolatile memory include a flash memory an HDD (Hard Disk Drive), an SSD (Solid State Drive), and a ROM (Read Only Memory). The storage unit 16 stores, for example, a computer program and various parameters in the nonvolatile memory.

The reading unit 17 reads information from a computer-readable recording medium 17*a*. The recording medium 17*a* is, for example, an optical disk such as a CD or DVD, or a USB flash memory. The reading unit 17 is, for example, an optical drive or a USB terminal. The recording medium 17*a* has stored therein a computer program and various parameters, and by the reading unit 17 reading the recording medium 17*a*, the computer program and various parameters are stored in the nonvolatile memory of the storage unit 16.

The first oscillator 18 is an element used as a clock source for the circuits included in the in-vehicle device 10. The first oscillator 18 is, for example, a crystal resonator. Note that the first oscillator 18 may also be a ceramic resonator. In the example of FIG. 1, one first oscillator 18 is provided in the in-vehicle device 10, and oscillation components are supplied from the first oscillator 18 to the oscillation circuit 41 included in the control unit 15.

The temperature sensor 19 is a sensor that detects the temperature of the first oscillator 18. The temperature sensor 19 is, for example, an RTD (Resistance Temperature Detector) such as a thermistor. Note that the temperature sensor 19 may also be a thermocouple thermometer or an infrared radiation thermometer. The temperature sensor 19 outputs a detected signal to the control unit 15.

Configuration of Detection Circuit 14

The following will describe the internal configuration of the detection circuit 14. As shown in FIG. 3, the detection circuit 14 includes an extraction circuit 42, a first circuit 43, and a second circuit 44.

Here, the received signal RS1 is a signal in which the second oscillation signal SG2 (clock) and a data signal DS2 are superimposed in one differential signal. With this, both the second oscillation signal SG2 and the data signal DS2 can be transmitted by one type of communication line 30.

The extraction circuit 42 is a circuit that extracts the second oscillation signal SG2 from the received signal RS1 and outputs the extracted second oscillation signal SG2 to the first circuit 43. The extraction circuit 42 is a CDR (Clock Data Recovery) circuit, for example.

To the first circuit 43, the first oscillation signal SG1 is input from the oscillation circuit 41 and the second oscillation signal SG2 is input from the extraction circuit 42. The first circuit 43 is a circuit that detects the difference between the frequency of the first oscillation signal SG1 and the frequency of the second oscillation signal SG2. The first circuit 43 is a PFD (Phase Frequency Detector) circuit, for example. The difference detected by the first circuit 43 is output to the second circuit 44 as, e.g., a pulse wave.

The second circuit 44 is a circuit that converts the difference detected in the first circuit 43 into the detected value Vx. The second circuit 44 includes a CP (Charge Pump) circuit 45, a filter circuit 46, and an AD (Analog to Digital) conversion circuit 47. The difference detected in the first circuit 43 is input to the CP circuit 45.

The CP circuit 45 is a circuit that outputs a current signal (pulse current) corresponding to the difference (pulse wave) detected in the first circuit 43, and includes a capacitor and a diode, for example. The current signal output from the CP circuit 45 is input to the filter circuit 46.

The filter circuit 46 is a circuit that converts the current signal output from the CP circuit 45 into a voltage value. The filter circuit 46 is, for example, a lag lead filter, and converts the pulse current to a smoothed voltage value. The voltage value output from the filter circuit 46 is input to the AD conversion circuit 47.

The AD conversion circuit 47 is a circuit that converts the voltage value (analog value) output from the filter circuit 46 into a digital value. The AD conversion circuit 47 outputs the converted digital value to the control unit 15 as the detected value Vx. Note that the AD conversion circuit 47 may also be provided inside the control unit 15.

Detection Method

The following will describe a method for detecting an unauthorized intrusion in the in-vehicle system 1.

Figure 4:
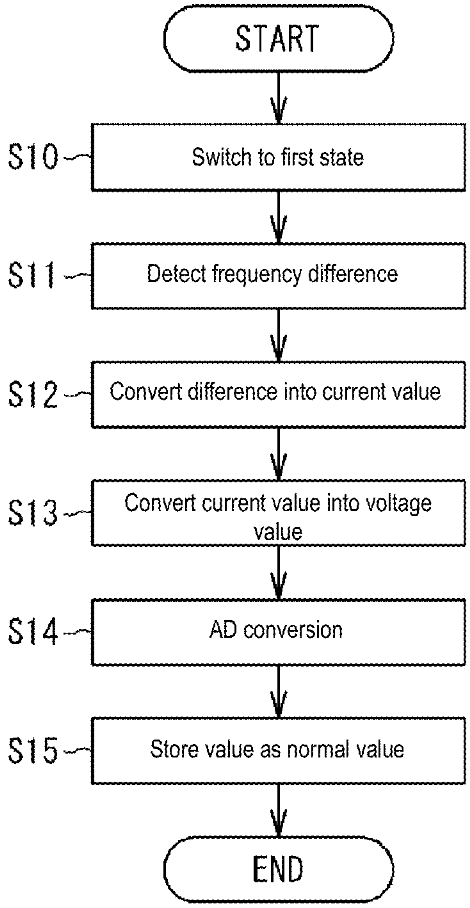
FIG. 4 is a flowchart showing an example of a detection method according to the embodiment.
Figure 5:
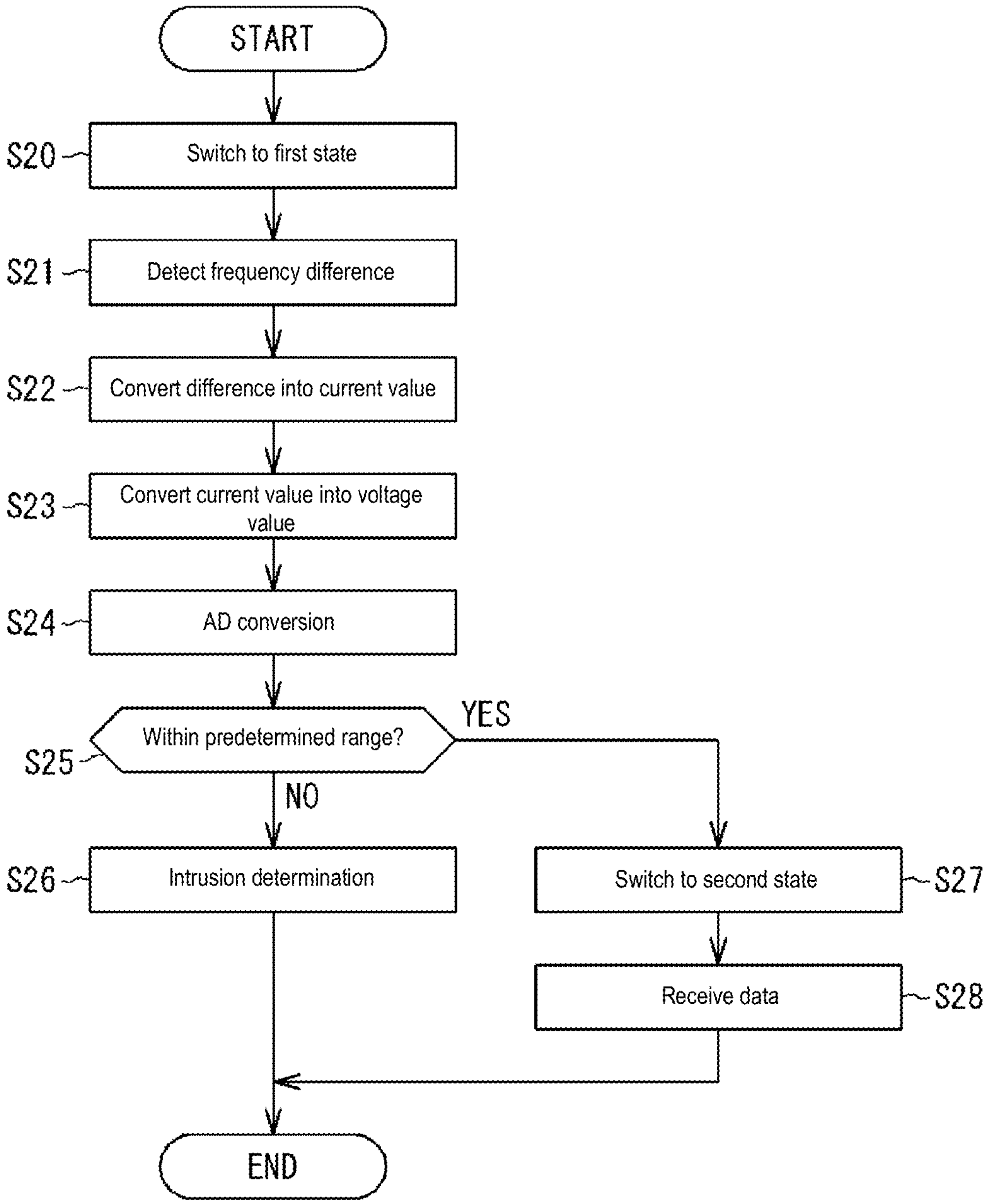
FIG. 5 is a flowchart showing an example of the detection method according to the embodiment.

FIGS. 4 and 5 are flowcharts showing examples of the detection method according to the embodiment. FIGS. 4 and 5 show controls executed by the in-vehicle device 10.

Figure 6:
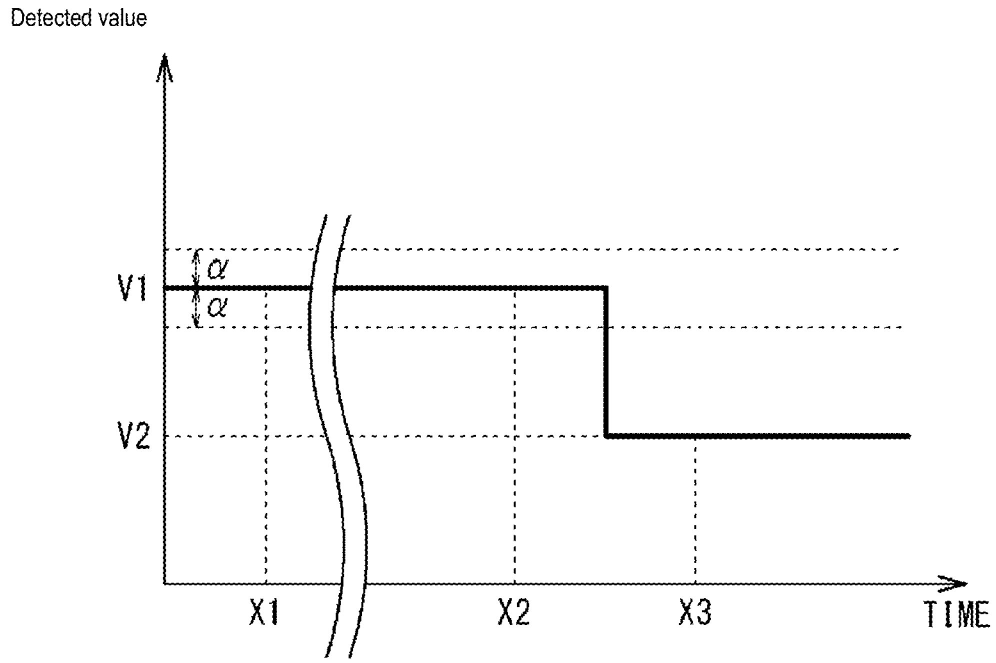
FIG. 6 is a graph showing an example of a detected value according to the embodiment.

FIG. 6 is a graph showing a detected value Vx according to the embodiment.

In the in-vehicle system 1, first, storage of the normal value V1 is performed, and then detection of unauthorized intrusion is performed. FIG. 4 is a flowchart showing a procedure for storing the normal value V1, and FIG. 5 is a flowchart showing a procedure for executing detection of unauthorized intrusion. FIG. 6 is a graph showing timings at which the procedures of FIGS. 4 and 5 are executed, with the vertical axis thereof indicating the detected value Vx and the horizontal axis thereof indicating the time.

The storage of the normal value V1 is performed in the manufacturing plant of the vehicle 9, for example, prior to shipment of the vehicle 9, that is, at time X1 in FIG. 6. Because, prior to shipment of the vehicle 9 (i.e., in the manufacturing plant), the risk of unauthorized intrusion into the in-vehicle system 1 is low, the normal value V1 can be registered in the storage unit 16 on the assumption that there is no unauthorized intrusion.

FIG. 4 is referenced. First, the switch unit 13 is switched to the first state (indicated by the solid line in FIG. 3) in accordance with a control instruction of the control unit 15 (step S10). With this measure, a received signal RS1 received from the communication line 31 is input to the detection circuit 14 via the switch unit 13. In this example, in the first state, the entire received signal RS1 is input to the detection circuit 14, but as described above, some parts of the received signal RS1 may be input to the PHY unit 11*a*.

Then, the first circuit 43 detects the difference between the frequency of the first oscillation signal SG1 generated based on the oscillation of the first oscillator 18 and the frequency of the third oscillation signal SG3 generated based on the oscillation of the second oscillator 71 in the ECU 21 (step S11). Specifically the in-vehicle device 10 and the ECU 21 are activated, and a test signal in which the third oscillation signal SG3 and a data signal are superimposed is transmitted from, for example, the ECU 21 to the in-vehicle device 10 via the communication line 31. The in-vehicle device 10 receives the test signal as the received signal RS1.

The received signal RS1 is input to the CDR circuit 42 via the first port 13*a* of the switch unit 13. In the CDR circuit 42, the third oscillation signal SG3 is extracted from the received signal RS1, and the third oscillation signal SG3 is input to the first circuit 43 (PFD circuit). The first oscillation signal SG1 generated in the oscillation circuit 41 based on the oscillation of the first oscillator 18 is also input to the first circuit 43. The first circuit 43 compares the frequency of the first oscillation signal SG1 with the frequency of the third oscillation signal SG3, and outputs the frequency difference to the second circuit 44, as a pulse wave. With this, the step S11 is ended.

Subsequently the second circuit 44 converts the frequency difference into the detected value Vx (step S12 to step S14). Specifically the CP circuit 45 converts the frequency difference into a current value (step S12), the filter circuit 46 converts the current value into a voltage value (step S13), and the AD conversion circuit 47 converts the voltage value into a digital value (step S14).

Ultimately the control unit 15 stores the detected value Vx in the storage unit 16 as the normal value V1 (step S15). Specifically the AD conversion circuit 47 outputs, as the detected value Vx, the digital value to the control unit 15. The control unit 15 stores the input detected value Vx in the storage unit 16 as the normal value V1. With this, the step S15 is ended.

FIGS. 5 and 6 are referenced. Detection of unauthorized intrusion is performed, for example, when the in-vehicle device 10 is powered on. Note that detection of unauthorized intrusion may be performed on a regular basis or in response to an operation of an occupant of the vehicle 9, while the power of the in-vehicle device 10 is on, for example. In FIG. 6, detection of unauthorized intrusion is performed at time X2 and time X3 after shipment of the vehicle 9, for example.

In the detection of unauthorized intrusion, first, the switch unit 13 is switched to the first state in accordance with a control instruction of the control unit 15 (step S20). Accordingly a received signal RS1 received from the communication line 31 is input to the detection circuit 14 via the switch unit 13.

Then, the first circuit 43 detects the difference between the frequency of the first oscillation signal SG1 and the frequency of the second oscillation signal SG2 contained in the received signal RS1 received from the communication line 31 (step S21).

Specifically the in-vehicle device 10 receives the received signal RS1 from the communication line 31. Here, at the time of step S21, it is unknown whether the received signal RS1 is a signal (regular signal) emitted from the ECU 21 as shown in FIG. 1 or a signal (unauthorized signal) emitted from the unauthorized hub H1 as shown in FIG. 2.

The received signal RS1 is input to the CDR circuit 42. In the CDR circuit 42, the second oscillation signal SG2 is extracted from the received signal RS1, and the second oscillation signal SG2 is input to the first circuit 43. The first oscillation signal SG1 is also input to the first circuit 43. The first circuit 43 compares the frequency of the first oscillation signal SG1 with the frequency of the second oscillation signal SG2, and outputs the frequency difference to the second circuit 44, as a pulse wave. With this, the step S21 is ended.

Subsequently the second circuit 44 converts the frequency difference into the detected value Vx (step S22 to step S24). Specifically the CP circuit 45 converts the frequency difference into a current value (step S22), the filter circuit 46 converts the current value into a voltage value (step S23), and the AD conversion circuit 47 converts the voltage value into a digital value (step S24). The AD conversion circuit 47 outputs the digital value to the control unit 15 as the detected value Vx.

Then, the control unit 15 monitors whether or not the detected value Vx is within a predetermined range (step S25). Here, if the second oscillation signal SG2 contained in the received signal RS1 is a signal based on the second oscillator 71 included in the ECU 21, the frequency of the second oscillation signal SG2 and the frequency of the third oscillation signal SG3 are within the range of ±2 ppm, for example, and are substantially equal to each other. On the other hand, if the second oscillation signal SG2 is a signal based on the third oscillator H2 included in the hub H1, the frequency of the second oscillation signal SG2 will differ from the frequency of the third oscillation signal SG3 in most cases, except when the two signals coincide by chance.

In step S25, it is monitored how much the detected value Vx (i.e., the value corresponding to the difference between the first oscillation signal SG1 and the second oscillation signal SG2) differs from the normal value V1 (i.e., the value corresponding to the difference between the first oscillation signal SG1 and the third oscillation signal SG3). If the values differ from each other by more than a predetermined value, the second oscillation signal SG2 is not considered to be a signal caused by the second oscillator 71, and thus it is determined that there is an unauthorized intrusion.

Specifically the control unit 15 compares the input detected value Vx with the normal value V1 stored in the storage unit 16. For example, the control unit 15 calculates the absolute value ($|Vx-V1|$) of the difference between the detected value Vx and the normal value V1.

If the detected value Vx differs from the normal value V1 by more than a predetermined value (margin value $\alpha$) (NO in step S25), the control unit 15 determines that there is an unauthorized intrusion into the communication line 31 (intrusion determination in step S26). For example, if the absolute value of the difference between the detected value Vx and the normal value V1 exceeds the margin value $\alpha$ ($|Vx-V1|>\alpha$), the control unit 15 determines that there is an intrusion.

Here, the margin value $\alpha$ is set as appropriate, according to the accuracy in detection of unauthorized intrusion required in the in-vehicle device 10. The smaller the margin value $\alpha$ is set, the easier it is to detect unauthorized intrusion. On the other hand, due to the influence of the temperature and other factors described later, the detected value Vx tends to differ from the normal value V1 by more than the margin value $\alpha$ even when there is no unauthorized intrusion, resulting in an increase in the possibility of erroneous determination. Also, the larger the margin value $\alpha$ is set, the less likely erroneous determination is to occur, but an unauthorized intrusion is more likely to be overlooked. The margin value $\alpha$ is set to a value less than or equal to 2 ppm, for example.

If it is determined that there is an intrusion, the control unit 15 maintains the switch unit 13 in the first state, thereby preventing the received signal RS1 from being input to the PHY unit 11*a*. Also, the control unit 15 may perform display of notifying that there is an unauthorized intrusion on a not-shown display unit (e.g., display). For example, the control unit 15 may display text such as "An unauthorized intrusion has been detected" on the display unit.

On the other hand, if the detected value Vx is within the predetermined value (margin value $\alpha$) from the normal value V1 (YES in step S25), the control unit 15 determines that there is no intrusion, and switches the switch unit 13 to the second state (step S27). For example, the control unit 15 executes step S27 if the absolute value of the difference between the detected value Vx and the normal value V1 is less than or equal to the margin value $\alpha$ ($|Vx-V1|<\alpha$). With this measure, as a result of the PHY unit 11*a* receiving the received signal RS1 and the received signal RS1 being converted into the digital signal DS1 in the PHY unit 11*a*, the processing device 12 receives the digital signal DS1 (step S28).

After step S28, the processing device 12 performs various types of controls such as communicating with the ECU 21, based on the digital signal DS1. With this, the detection of unauthorized intrusion is ended.

In the example of FIG. 6, at time X2, the detected value Vx is the value V1 (Vx=V1). Since the detected value Vx is a value within the range from the normal value V1 to the margin value $\alpha$, no unauthorized intrusion is detected at time X2. In this case, the control unit 15 switches the switch unit 13 from the first state to the second state.

On the other hand, at time X3, the detected value Vx is the value V2 (Vx=V2). Since the detected value Vx is a value that differs from the normal value V1 by more than the margin value $\alpha$, an unauthorized intrusion is detected at time X3. In this case, the control unit 15 maintains the switch unit 13 in the first state.

Although the unauthorized terminal D1 and the hub H1 can imitate the communication sequence or the like of the ECU 21, they cannot imitate the third oscillation signal SG3 caused by the second oscillator 71 of the ECU 21. Therefore, by determining whether or not the frequency of the second oscillation signal SG2 received in the in-vehicle device 10 corresponds to the frequency of the third oscillation signal SG3 of the ECU 21, it is possible to detect an unauthorized intrusion more reliably.

Also, while, in the in-vehicle device 10, it is determined that there is an unauthorized intrusion, the switch unit 13 is maintained in the first state so that the received signal RS1 is not input to the PHY unit 11*a*. This allows the received signal RS1 to be input to the PHY unit 11*a* only when there is no unauthorized intrusion, making it possible to prevent input of an unauthorized received signal RS1 to the PHY unit 11*a*.

Also, since input of the received signal RS1 to the PHY unit 11*a* while it is determined that there is an unauthorized intrusion, the PHY unit 11*a* can be maintained in a power saving state such as a sleep state, making it possible to prevent the power consumption of the in-vehicle device 10.

Furthermore, determination as to whether or not there is an unauthorized intrusion is executed in the detection circuit 14 and the control unit 15, which are provided outside the PHY unit 11*a*, and thus a general-purpose PHY unit can be used as the PHY unit 11*a*. Accordingly there is no need of manufacturing a PHY unit dedicated to determining as to whether or not there is an unauthorized intrusion, resulting in a reduction in the manufacturing cost of the PHY unit. Particularly the in-vehicle device 10 is provided with a plurality of PHY units, and thus by reducing the manufacturing cost of the PHY units, it is possible to reduce the manufacturing cost of the in-vehicle device 10.

Modification

The following will describe a modification of the embodiment. In the modification, the same reference numerals are added to the same configuration as in the above-described embodiment, and description thereof are omitted.

Figure 7:
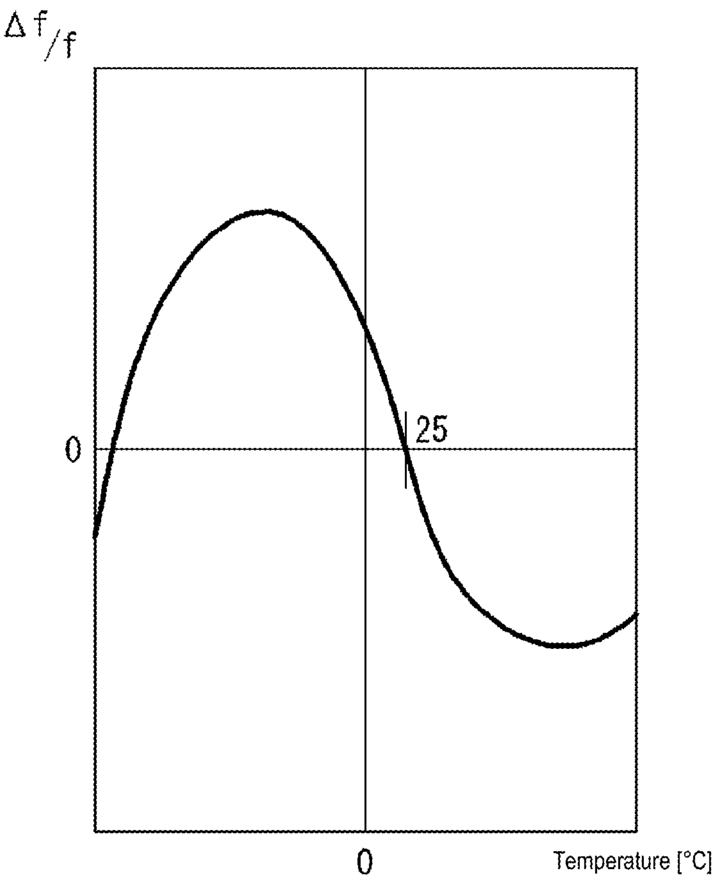
FIG. 7 is a graph showing an example of temperature characteristics of an oscillator.

Correction of Normal Value According To Temperature Characteristics FIG. 7 is a graph showing an example of temperature characteristics of an oscillator. The horizontal axis in FIG. 7 indicates the centigrade temperature, and the vertical axis in FIG. 7 indicates the frequency deviation ($\Delta f/f$) of the oscillator at each temperature with respect to the frequency of the oscillator at 25 degrees Celsius.

It is known that the frequency at which an oscillator, such as a crystal oscillator, oscillates varies with the temperature, as shown in FIG. 7. For example, when the temperature is higher than 25 degrees Celsius, the frequency of the oscillator tends to gradually decrease, and after reaching a local minimum value, tends to gradually increase. When the temperature is lower than 25 degrees Celsius, the frequency of the oscillator tends to gradually increase, and after reaching a local maximum value, tends to gradually decrease.

Accordingly for example, if the above-described storage of the normal value V1 (steps S11 to S15) is performed in an environment of 25 degrees Celsius, and the detection of unauthorized intrusion (steps S21 to S25) is performed in an environment of 40 degrees Celsius (e.g., in summer), the frequency of the first oscillator 18 included in the in-vehicle device 10 and the frequency of the second oscillator 71 included in the ECU 21 will decrease compared to the respective frequencies when the normal value V1 was stored. The degrees to which the frequencies decrease differ between the first oscillator 18 and the second oscillator 71.

Accordingly if the detection of unauthorized intrusion is performed at a temperature different from the temperature when the normal value V1 was stored, and the margin value α is set to a smaller value (for example, 0.5 ppm), it may be determined that there is an intrusion (step S26) in response to the detected value Vx differing from the normal value V1 by more than the margin value α, regardless of the second oscillation signal SG2 based on the oscillation of the second oscillator 71 (that is, regardless of the absent of unauthorized intrusion).

In order to prevent such erroneous determination, the margin value α may be set to a large value. However, if the margin value α is set to a large value, the possibility that the detected value Vx corresponding to the second oscillation signal SG2 based on the oscillation of the third oscillator H2 of the unauthorized hub H1 will coincidentally be within the range of the margin value α with respect to the normal value V1 increases, causing a risk that an unauthorized intrusion is overlooked.

Therefore, in the present modification, the normal value V1 is determined based on the detected temperature detected by a temperature sensor that detects the temperature of at least one of the first oscillator 18 and the second oscillator 71. Accordingly, a frequency deviation of the oscillator caused by a temperature change is compensated.

Specifically, the temperature of the first oscillator 18 is detected by the temperature sensor 19 (FIG. 3). Since the in-vehicle system 1 is a system installed in the vehicle 9, the temperature of the second oscillator 71 is expected to be substantially the same as the temperature detected by the temperature sensor 19. Accordingly, in the present modification, the temperature of the entire in-vehicle system 1 including the first oscillator 18 is detected by the temperature sensor 19. Note that different temperature sensors may be provided in the first oscillator 18 and the second oscillator 71, respectively or a temperature sensor may be provided only in the vicinity of the second oscillator 71.

FIG. 8 is a table showing an example of a relationship between the normal value and the temperature according to the modification. The table of FIG. 8 is stored in the storage unit 16. In FIG. 8, the first column of the table indicates temperature ranges, and the second column of the table indicates the normal values corresponding to the temperature ranges. The table in FIG. 8 is obtained, by conducting tests under various temperature conditions on the in-vehicle system 1 prior to shipment, for example.

If, for example, the detected temperature Tx of the temperature sensor 19 is less than or equal to a first temperature T1, the control unit 15 reads the normal value in the first low from the storage unit 16 and determines the normal value as "V11". Also, if the detected temperature Tx of the temperature sensor 19 exceeds the first temperature T1 and is less than or equal to a second temperature T2, the control unit 15 reads the normal value in the second low from the storage unit 16 and determines the normal value as "V12", which is different from V11. Also, if the detected temperature Tx of the temperature sensor 19 exceeds the second temperature T2 and is less than or equal to a third temperature T3, the control unit 15 reads the normal value in the third low from the storage unit 16, and determines the normal value as "V13", which is different from V11 and V12.

In this way the control unit 15 determines the normal value based on the table stored in the storage unit 16 and the detected temperature Tx. With this measure, since frequency deviations of the first oscillator 18 and the second oscillator 71 caused by a temperature change can be compensated, it is possible to prevent erroneous determination even when the margin value α is set to a smaller value, for example. Accordingly it is possible to set a margin value α that has a low risk of overlooking an unauthorized intrusion, while suppressing erroneous determination, thus enabling more reliable detection of unauthorized intrusion.

Correction of Normal Value According to Aging Characteristics

Figure 9:
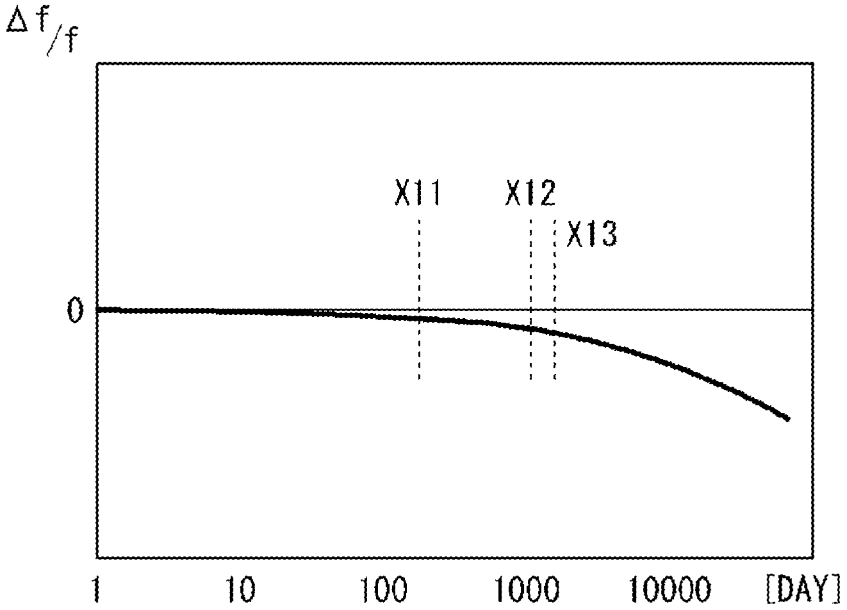
FIG. 9 is a graph showing an example of aging characteristics of the oscillator.

FIG. 9 is a graph showing an example of aging characteristics of an oscillator. The horizontal axis in FIG. 9 indicates the elapsed days in logarithm, and the vertical axis in FIG. 9 indicates the frequency deviation (Δf/f) of the oscillator at each point in time with respect to the frequency of the oscillator at the first day.

It is known that the frequency at which an oscillator such as a crystal oscillator oscillates changes over time, as shown in FIG. 9. FIG. 9 shows an example in which the frequency of an oscillator gradually decreases (oscillation gradually slows down) due to impurities adhering to the oscillator over time. However, depending on the characteristics of the oscillator, for example, the frequency of the oscillator may gradually increase due to the release of gas from the oscillator over time, and after reaching a local maximum value in a certain number of elapsed days, the frequency may gradually decrease.

Accordingly for example, if the above-described storage of the normal value V1 (steps S11 to S15) is performed in an environment of a smaller number of elapsed days (e.g., 10 days), and the detection of unauthorized intrusion (steps S21 to S25) is performed after, for example, 1000 days from the storage, the detected value Vx may differ from the normal value V1 by more than the margin value α, due to the frequencies of the first oscillator 18 and the second oscillator 71 differing from those when the normal value V1 was stored, and it may be determined that there is an intrusion (step S26) even though there is no unauthorized intrusion.

Accordingly in the present modification, in order to take into account the aging characteristics of the first oscillator 18 and the second oscillator 71, the normal value V1 stored in the in-vehicle device 10 is updatable by an operation of an administrator. With this configuration, a frequency deviation of the oscillators caused by an aging-related change is compensated.

For example, for inspections of the vehicle 9, the owner of the vehicle 9 takes the vehicle 9 to a business operator (e.g., a dealer) that performs periodic vehicle inspections. The business operator is, for example, an administrator authorized by the manufacturer of the in-vehicle system 1 to manage the in-vehicle system 1 and has a key to update the normal value V1. The key may be, for example, a hardware key that is inserted into the in-vehicle device 10, or may be a software key that is input to the in-vehicle device 10.

For example, the control unit 15 can select a plurality of operation modes, including a first mode and a second mode.

In normal operations, the second mode is selected as the operating mode of the control unit 15. When the second mode is selected, the control unit 15 cannot change the normal value V1 stored in the storage unit 16. Only when the key is input to the in-vehicle device 10 by the administrator, the control unit 15 can select the first mode.

When the first mode is selected, the control unit 15 performs the storage of the normal value V1 shown in FIG. 4 in response to the administrator using a not-shown input unit (e.g., keyboard) to instruct the control unit 15 to update the normal value V1. The control unit 15 then changes the normal value V1 stored in the storage unit 16 to the detected value Vx to be output from the detection circuit 14 while the first mode is selected.

For example, at the first year inspection of the vehicle 9 (time point X11 in FIG. 9), the administrator updates the normal value V1 to a new value. Also, at the third year inspection of the vehicle 9 (time point X12 in FIG. 9) and the fifth year inspection of the vehicle 9 (time point X13 in FIG. 9), the administrator updates the normal value. With this measure, a frequency deviation of the oscillator caused by an aging-related change can be compensated, and thus it is possible to set a margin value α that has a low risk of overlooking an unauthorized intrusion, while suppressing erroneous determination, as in the case of compensation based on the temperature. As a result, it is possible to detect an unauthorized intrusion more reliably.

Change Temperature of Oscillator by Design

In the above-described embodiment, an unauthorized intrusion is detected using the fact that the second oscillator 71 included in the ECU 21 and the third oscillator H2 included in the unauthorized hub H1 are different from each other in terms of hardware. However, if the frequency of the second oscillator 71 and the frequency of the third oscillator H2 coincide by chance, there is a risk that an unauthorized intrusion cannot be detected.

In the present modification, therefore, the temperature of the second oscillator 71 is changed by design, and an unauthorized intrusion is detected if the detected value Vx after the temperature change differs from a normal value V4 subjected to temperature compensation by more than the margin value α.

Figure 10:
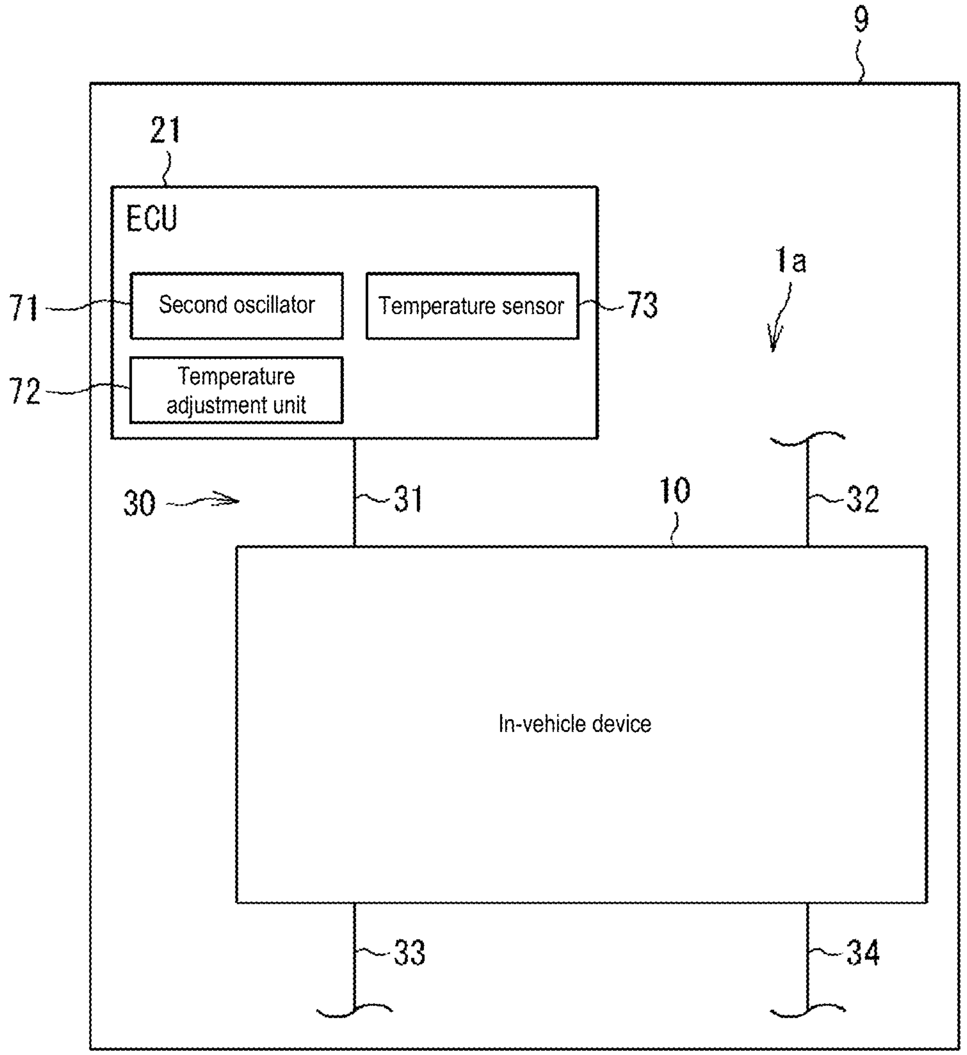
FIG. 10 is a diagram showing a configuration of an in-vehicle system according to the modification.

FIG. 10 is a diagram showing a configuration of an in-vehicle system 1*a* according to the modification. The in-vehicle system 1*a* differs from the in-vehicle system 1 of FIG. 1, in that the ECU 21 includes a temperature adjustment unit 72 for adjusting the temperature of the second oscillator 71, and a temperature sensor 73 for detecting the temperature of the second oscillator 71. Also, in the present modification, the control unit 15 gives an instruction signal to the temperature adjustment unit 72 to control the temperature adjustment unit 72.

The temperature adjustment unit 72 is, for example, a heating unit such as a resistance heater capable of only heating. Note that the temperature adjustment unit 72 may also be capable of both heating and cooling. In this case, the temperature adjustment unit 72 is, for example, a Peltier element.

Figure 11:
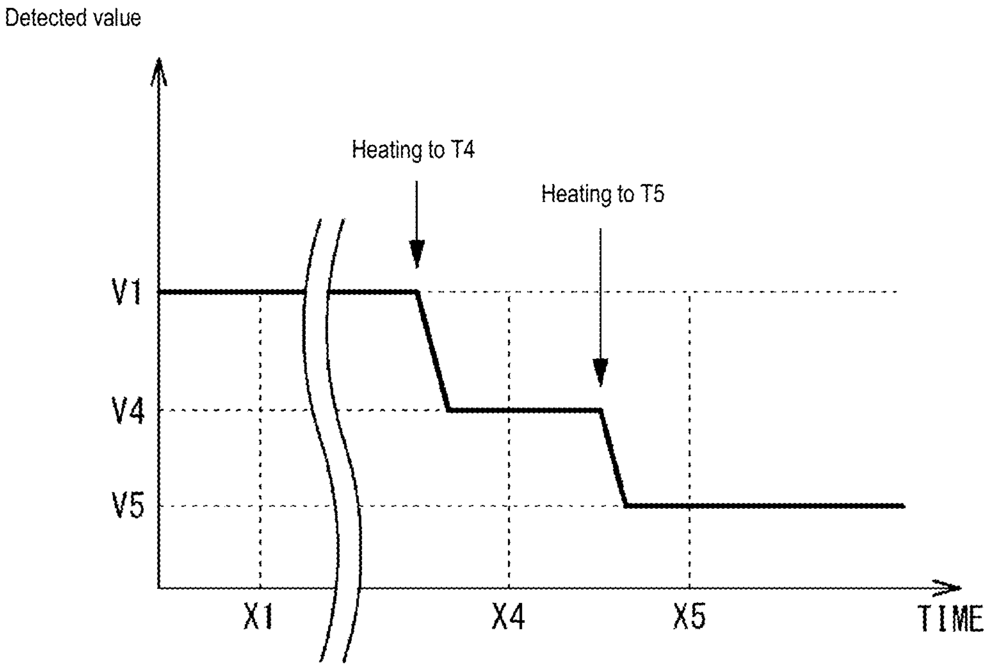
FIG. 11 is a graph showing an example of a detected value according to the modification.

FIG. 11 is a graph showing an example of a detected value Vx according to the modification. In the present modification, the normal value is subjected to temperature compensation. For example, the normal value at 25 degrees Celsius is defined as "V1", the normal value at a first given temperature T4 higher than 25 degrees Celsius is defined as "V4", and the normal value at a second given temperature T5 higher than the first given temperature T4 is defined as "V5".

For example, a case where the detection environment is 25 degrees Celsius is considered. First, while the temperature control unit (control unit 15) gives no instruction to the temperature adjustment unit 72 (that is, while the second oscillator 71 is 25 degrees Celsius), the in-vehicle device 10 performs the detection of unauthorized intrusion. In this case, if the same value as the normal value V1 is detected as the detected value Vx, no unauthorized intrusion is detected.

If no unauthorized intrusion is detected at 25 degrees Celsius, there may be a case where the frequency of the second oscillator 71 and the frequency of the third oscillator H2 coincide by chance. Therefore, the control unit 15 then instructs the temperature adjustment unit 72 to adjust the temperature of the second oscillator 71 to the first given temperature T4. At time X4 at which the temperature of the second oscillator 71 is the first given temperature T4, the in-vehicle device 10 performs again the detection of unauthorized intrusion.

Specifically the detection circuit 14 outputs, to the control unit 15, the first detected value Vx1, which is the detected value Vx corresponding to the difference between the frequency of the first oscillation signal SG1 and the frequency of the second oscillation signal SG2 contained in the received signal RS1 received while the second oscillator 71 is adjusted to have the first given temperature T4 in response to the instruction from the control unit 15.

Then, the control unit 15 determines that there is an unauthorized intrusion into the communication line 31, if the first detected value Vx1 differs, by more than a predetermined value (margin value α), from the first normal value V4, which is a normal value corresponding to the difference between the frequency of the first oscillation signal SG1 and the frequency of the third oscillation signal SG3 generated based on the oscillation of the second oscillator 71 while the second oscillator 71 is adjusted to have the first given temperature T4 in response to the instruction from the temperature control unit.

For example, if there is an unauthorized intrusion, even if the temperature of the second oscillator 71 is adjusted to the first given temperature T4 by the temperature adjustment unit 72, the temperature of the third oscillator H2 of the unauthorized hub H1 is not changed, so the first detection value Vx1 is "V1". On the other hand, if there is no unauthorized intrusion, the first detection value Vx1 is "V4" in accordance with the temperature adjustment of the second oscillator 71. Accordingly in the present modification, if the first detected value Vx1 does not follow the temperature adjustment by the temperature adjustment unit 72, an unauthorized intrusion is detected, and if the first detected value Vx1 follows the temperature adjustment by the temperature adjustment unit 72, no unauthorized intrusion is detected. With this measure, even if the frequency of the second oscillator 71 and the frequency of the third oscillator H2 coincide by chance, it can be determined that there is an unauthorized intrusion.

Also, at time X5 after the temperature of the second oscillator 71 has been further changed by the temperature adjustment unit 72 to the second given temperature T5 higher than the first given temperature T4, the in-vehicle device 10 may perform again the detection of unauthorized intrusion. By changing the temperature multiple times and performing the detection of unauthorized intrusion each time the temperature is changed, it is possible to further increase the detection accuracy.

Specifically, the detection circuit 14 outputs, to the control unit 15, the second detected value Vx2, which is the detected value Vx according to the difference between the frequency of the first oscillation signal SG1 and the frequency of the second oscillation signal SG2 contained in the received signal RS1 received while the second oscillator 71 is adjusted to have the second given temperature T5 in response to the instruction from the control unit 15.

Then, the control unit 15 determines that there is an unauthorized intrusion into the communication line 31, if the second detected value Vx2 differs, by more than a predetermined value (margin value α), from the first normal value V5, which is a normal value corresponding to the difference between the frequency of the first oscillation signal SG1 and the frequency of the third oscillation signal SG3 generated based on the oscillation of the second oscillator 71 while the second oscillator 71 is adjusted to have the second given temperature T5 in response to the instruction from the temperature control unit.

Note that the first given temperature T4 may be a temperature lower than 25 degrees Celsius, and the second given temperature T5 may be a temperature lower than the first given temperature T4.

SUPPLEMENTARY DESCRIPTION

Note that at least parts of the above-described embodiment and various modifications may be combined with each other as appropriate. Also, the embodiment and modifications disclosed herein should be considered to be illustrative in all respects and not restrictive. The scope of the present disclosure is defined by the claims, and all modifications within the meaning and scope equivalent to the claims are intended to be included.

The invention claimed is:

1. An in-vehicle device connected to an ECU installed in a vehicle by a communication line, the in-vehicle device comprising:

a PHY unit configured to convert a received signal received from the communication line into a digital signal;

an oscillation circuit configured to output a first oscillation signal based on an oscillation of a first oscillator;

a detection circuit configured to output a detected value corresponding to a difference between a frequency of the first oscillation signal and a frequency of a second oscillation signal contained in the received signal;

a switch unit configured to switch between a first state in which at least a part of the received signal is not input to the PHY unit, and a second state in which the received signal is input to the PHY unit; and a control unit configured to control the switch unit, wherein the control unit controls the switch unit to be in the first state if the detected value differs, by more than a predetermined value, from a normal value corresponding to a difference between the frequency of the first oscillation signal and a frequency of a third oscillation signal generated based on an oscillation of a second oscillator included in the ECU, and controls the switch unit to be in the second state if the detected value is within the predetermined value from the normal value.

2. The in-vehicle device according to claim 1, wherein the detection circuit includes:

a first circuit to which the first oscillation signal and the second oscillation signal are input, and that is configured to detect a difference between the frequency of the first oscillation signal and the frequency of the second oscillation signal; and a second circuit configured to convert the difference detected by the first circuit into the detected value.

3. The in-vehicle device according to claim 2, wherein the received signal is a signal in which the second oscillation signal and a data signal are superimposed, and the detection circuit further includes an extraction circuit configured to extract the second oscillation signal from the received signal and output the extracted second oscillation signal to the first circuit.

4. The in-vehicle device according to claim 3, further including:

a storage unit in which the normal value is stored in advance.

5. The in-vehicle device according claim 3, wherein the control unit controls a temperature adjustment unit configured to adjust a temperature of the second oscillator, the detection circuit outputs a first detected value to the control unit, the first detected value being the detected value corresponding to a difference between the frequency of the first oscillation signal and the frequency of the second oscillation signal contained in the received signal received while the second oscillator is adjusted to have a first given temperature by the temperature adjustment unit; and the control unit controls the switch unit to be in the first state, if the first detected value differs from a first normal value by more than a predetermined value, the first normal value being the normal value corresponding to a difference between the frequency of the first oscillation signal and the frequency of the third oscillation signal generated based on the oscillation of the second oscillator while the second oscillator is adjusted to have the first given temperature by the temperature adjustment unit.

6. The in-vehicle device according to claim 2, further including:

a storage unit in which the normal value is stored in advance.

7. The in-vehicle device according claim 2, wherein the control unit controls a temperature adjustment unit configured to adjust a temperature of the second oscillator, the detection circuit outputs a first detected value to the control unit, the first detected value being the detected value corresponding to a difference between the frequency of the first oscillation signal and the frequency of the second oscillation signal contained in the received signal received while the second oscillator is adjusted to have a first given temperature by the temperature adjustment unit; and the control unit controls the switch unit to be in the first state, if the first detected value differs from a first normal value by more than a predetermined value, the first normal value being the normal value corresponding to a difference between the frequency of the first oscillation signal and the frequency of the third oscillation signal generated based on the oscillation of the second oscillator while the second oscillator is adjusted to have the first given temperature by the temperature adjustment unit.

8. The in-vehicle device according to claim 1, further including:

a storage unit in which the normal value is stored in advance.

9. The in-vehicle device according to claim 8, wherein the control unit is capable of selecting a plurality of operation modes, including a first mode and a second mode, and when the first mode is selected, the control unit changes the normal value stored in the storage unit to the detected value to be output from the detection circuit while the first mode is selected, and when the second mode is selected, the control unit does not change the normal value stored in the storage unit.

10. The in-vehicle device according to claim 8, wherein the control unit determines the normal value based on a detected temperature detected by a temperature sensor configured to detect a temperature of at least one of the first oscillator and the second oscillator.

11. The in-vehicle device according to claim 1, wherein the control unit controls a temperature adjustment unit configured to adjust a temperature of the second oscillator, the detection circuit outputs a first detected value to the control unit, the first detected value being the detected value corresponding to a difference between the frequency of the first oscillation signal and the frequency of the second oscillation signal contained in the received signal received while the second oscillator is adjusted to have a first given temperature by the temperature adjustment unit; and the control unit controls the switch unit to be in the first state, if the first detected value differs from a first normal value by more than a predetermined value, the first normal value being the normal value corresponding to a difference between the frequency of the first oscillation signal and the frequency of the third oscillation signal generated based on the oscillation of the second oscillator while the second oscillator is adjusted to have the first given temperature by the temperature adjustment unit.

12. A control method for controlling an in-vehicle device connected to an ECU installed in a vehicle by a communication line, the method comprising:

a first step of switching the in-vehicle device to a first state in which at least a part of a received signal received from the communication line is not input to a PHY unit, if a detected value differs from a normal value by more than a predetermined value; and a second step of switching the in-vehicle device to a second state in which the received signal is input to the PHY unit, if the detected value is within the predetermined value from the normal value, wherein the PHY unit converts the received signal into a digital signal, the detected value is a value corresponding to a difference between a frequency of a first oscillation signal output by an oscillation circuit included in the in-vehicle device based on an oscillation of a first oscillator and a frequency of a second oscillation signal contained in the received signal, and the normal value is a value corresponding to a difference between the frequency of the first oscillation signal and a frequency of a third oscillation signal generated based on an oscillation of a second oscillator included in the ECU.

13. A non-transitory, machine-readable medium storing a computer program for controlling an in-vehicle device connected to an ECU installed in a vehicle by a communication line, the computer program comprising instructions which, when executed by at least one programmable processor, performs operations comprising:

a first step of switching the in-vehicle device to a first state in which at least a part of a received signal received from the communication line is not input to a PHY unit, if a detected value differs from a normal value by more than a predetermined value; and a second step of switching the in-vehicle device to a second state in which the received signal is input to the PHY unit, if the detected value is within the predetermined value from the normal value, wherein the PHY unit converts the received signal into a digital signal, the detected value is a value corresponding to a difference between a frequency of a first oscillation signal output by an oscillation circuit included in the in-vehicle device based on an oscillation of a first oscillator and a frequency of a second oscillation signal contained in the received signal, and the normal value is a value corresponding to a difference between the frequency of the first oscillation signal and a frequency of a third oscillation signal generated based on an oscillation of a second oscillator included in the ECU.

* * * * *